United States Patent
Khoroshev et al.

(10) Patent No.: US 7,317,599 B2
(45) Date of Patent: Jan. 8, 2008

(54) MULTIFACTOR ADAPTIVE AUTO-RECLOSING OF HIGH VOLTAGE TRANSMISSION LINES

(75) Inventors: Mark I. Khoroshev, South Pasadena, CA (US); Vitaly Faybisovich, West Hollywood, CA (US)

(73) Assignee: Southern California Edison Company, Rosemead, CA (US)

( * ) Notice: Subject to any disclaimer, the term of this patent is extended or adjusted under 35 U.S.C. 154(b) by 72 days.

(21) Appl. No.: 11/057,950

(22) Filed: Feb. 14, 2005

(65) Prior Publication Data

US 2005/0195538 A1 Sep. 8, 2005

Related U.S. Application Data

(60) Provisional application No. 60/544,071, filed on Feb. 13, 2004.

(51) Int. Cl.
*H02H 3/00* (2006.01)
(52) U.S. Cl. ......................................................... 361/42
(58) Field of Classification Search ................... 361/42
See application file for complete search history.

(56) References Cited

U.S. PATENT DOCUMENTS 3,374,399 A * 3/1968 Dewey ........................ 361/80
4,485,422 A * 11/1984 Takanashi ................... 361/43
6,573,726 B1 * 6/2003 Roberts et al. ............. 324/509
2002/0149891 A1* 10/2002 Neiger et al. ................ 361/42

FOREIGN PATENT DOCUMENTS

| SU | 598170 | * | 2/1978 |
|---|---|---|---|
| SU | 817850 B | | 3/1981 |
| SU | 817850 | * | 4/1981 |

* cited by examiner

*Primary Examiner*—Michael Sherry
*Assistant Examiner*—Lucy Thomas
(74) *Attorney, Agent, or Firm*—Jeffrey G. Sheldon; Sheldon Mak Rose & Anderson PC (57) ABSTRACT

One embodiment of the invention provides a method, system, and device for the auto-reclosing a faulted power transmission line by measuring the characteristics of voltage on a faulted line to determine, in real-time, the moment that the secondary arc is extinguished. A device automatically selects between a plurality of arc extinguishing algorithms based on the compensation level of the transmission line. As a result, reclosing an on-going or existing fault is avoided, while restoration of normal power supply is performed with the minimal possible time interval.

19 Claims, 6 Drawing Sheets

MULTIFACTOR ADAPTIVE AUTO-RECLOSING OF HIGH VOLTAGE TRANSMISSION LINES

CROSS REFERENCE TO RELATED APPLICATION

This non-provisional U.S. patent application claims the benefit of provisional U.S. patent application Ser. No. 60/544,071, filed Feb. 13, 2004, titled "Methods Multifactor Adaptive Autoreclosing at High Voltage Transmission Lines."

FIELD

Various embodiments of the invention pertain to a circuit interrupting and reclosing device used with electrical power distribution systems as protection against a fault current. At least one embodiment of the invention pertains to a method, system and device for increasing the effectiveness of single-phase auto-switching or reclosing.

BACKGROUND

Power distribution systems typically include circuit-interrupting devices, such as circuit breakers, sectionalizers, and reclosers provide protection for the power distribution systems and the various apparatus on those power distribution systems, such as transformers, reactors, and capacitor banks by isolating a faulted section from the main part of the system. A common problem in almost any electrical power distribution system is a momentary disruption of electrical service, such as might be caused by a momentary short circuit. A fault current in the system can occur under various conditions, including, for example, power lines strung between poles could swing under wind loading, momentarily touching each other or a grounded conductor, lightening, an animal or tree shorting the power lines, arcing, or other transitory events. Any of these events could cause momentary power line short circuits or current surges, which could burn out a fuse, trip a circuit breaker, or damage other equipment in the power distribution system.

Conventional circuit-interrupting devices sense a fault and interrupt the current path. Conventional reclosers also reclose the current path and monitor continued fault conditions, thereby re-energizing the utility or power transmission line upon termination of the fault. This provides maximum continuity of electrical service. If a fault is permanent, the recloser remains open after a certain number of reclosing operations that can be pre-set.

Power distribution single-phase line-to-ground temporary faults constitute majority of the faults on high voltage transmission lines. For example, at 500 kV lines in about 70%-85% of the cases, after tripping of a faulted phase at both sides of a transmission line, fault is self-extinguished. It takes typically one to two seconds for reliable self-deionization of a secondary arc, supported by electromagnetic and electrostatic influence of healthy phases, but sometimes an arc lasts significantly longer.

Currently, fixed time delays are employed after a fault to automatically reclose a transmission line. However, using fixed time delays for single-phase auto-reclosing has two disadvantages. First, if the delay is longer than the duration of the arc fault self-extinguishing time, stability of the power system may be adversely affected. Secondly, if the delay is shorter than the arc fault duration, reclosing will be unsuccessful. This may cause all three phase transmission lines to be opened with an additional negative impact on the utility equipment and dynamic stability of the power system. Thus, a system for reclosing faulted transmission lines immediately after the secondary arc is self-extinguished is needed.

SUMMARY OF THE INVENTION

One feature of the invention relates to a method, system, and apparatus for improving the stability and reliability of power systems with high voltage transmission lines by increasing effectiveness of single phase switching or reclosing. Increasing of effectiveness is achieved through a real time monitoring of a secondary arc status after a faulted phase is opened and performing reclosing only after said arc is self-extinguished.

One embodiment of the invention provides auto-reclosing of a single faulted power transmission line by measuring the characteristics of voltage on a faulted line to determine, in real-time, the moment that the secondary arc is extinguished. A device automatically selects between a plurality of arc extinguishing algorithms based on the compensation level of the transmission line. As a result, reclosing an ongoing or existing fault is avoided, while restoration of normal power supply is performed with the minimal possible time interval.

An embodiment of the invention provides for (1) opening a transmission line when an arc fault has occurred; (2) determining the level of capacitive compensation of the transmission line; (3) detecting when the arc fault has been extinguished by automatically selecting between one of a plurality of detection modes based on the level of capacitive compensation of the transmission line; and (4) reclosing the transmission line when the arc fault has been extinguished. A plurality of algorithms, based on the compensation level of a transmission line, may be employed in determining when an arc has been extinguished. When all transmission line capacitive compensation is switch off, arc fault extinguishing is detected by measuring of a phase shift between a recovery voltage on the transmission line and a symmetrical component of a current of the transmission line. Alternatively, when all transmission line capacitive compensation is switch off, arc fault extinguishing is detected by measuring of an angle between the vector of and recovery voltage on the transmission line and a vector of the difference between voltages on both ends of the transmission line. When the transmission line capacitive compensation is below a predetermined level but greater than zero, arc fault extinguishing is detected by measuring a frequency of a recovery voltage at the transmission line, a decrease in the frequency of the recovery voltage indicates that the arc has been extinguished. When the transmission line capacitive compensation is greater than a predetermined level, arc fault extinguishing is detected by measuring the amplitude of a recovery voltage on the transmission line, a change in the measured amplitude from a first amplitude level to an increased amplitude level indicates that the arc has been extinguished. The level of capacitive compensation of the transmission line may be defined by the number of shunt reactors coupled to the transmission line.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, the term "faulted" (e.g., faulted line) refers to a transmission line or phase that has been opened at least at one end. The term "compensated" refers to reactor compensation on a transmission line.

Typical power transmission systems include, alternating current, high voltage transmission lines having both of their terminals connected to the power grid through circuit breakers. This allows single-phase operation at both ends of a transmission line. Compensating devices, such as shunt reactors and other capacitance-compensating devices, are typically coupled to the transmission lines. Occasionally, a single-phase-to-ground short circuit occurs which causes a relay protection to trigger circuit breakers or circuit-interrupting devices at both ends of the power transmission line to open a faulted phase or power transmission line. Due to electromagnetic coupling with adjacent, unfaulted, power transmission phases/lines a secondary arc, e.g., from the faulted phase-to-ground, is supported for a period of time. When the secondary arc is self-extinguished, the line may be closed from both ends, and normal power supply can be restored.

According to one embodiment of the invention, a multifactor adaptive auto-reclosing method, system, and/or device permit using measurements of the electrical characteristics of the voltage present at the faulted line to determine, in real-time, the moment that a secondary arc is extinguished. As a result, reclosing an existing fault is avoided, while restoration of the normal power supply is performed with the minimal possible interruption.

One approach is based on measuring the parameters of a recovery voltage, which may include an induced voltage and a free component voltage, at a faulted power transmission line after a fault is cleared (e.g., the transmission line is opened at both ends) from both ends of said power transmission line. The amplitude, frequency, and other characteristics of the recovery voltage are strongly affected by the presence of a secondary arc (e.g. to ground or an adjacent transmission line). Analysis has shown that, for a high voltage transmission line without compensating reactors, the status of the secondary arc may be determined through tracing the phase of the recovery voltage on the open/faulted transmission line. This recovery voltage has a significant power frequency component and may also have an induced voltage component. By comparing the phase of this recovery voltage component with the phase of the reference vector (e.g., the phase of a zero sequence current $I_0$) it is possible to reliably establish the moment that the secondary arc is extinguished.

Unfortunately, such method of secondary arc detection is not workable in the presence of shunt reactors. When shunt reactors are present, the recovery voltage in a power transmission line undergoes more complex performance as a result of the superposition of forced/induced and free components of the recovery voltage. The recovery voltage includes a slowly declining free component, which frequency is not equal to the main system frequency. Measurement of a characteristic or parameter of the recovery voltage relative to a reference current or voltage of the power system frequency provides inaccurate results. The changing measurements of the free component of the recovery voltage, while it decays, may result in significant delays in reclosing until the free component is diminished.

The following description of a suggested method for an adaptive multifactor auto-reclosing method, system, and/or device is based on a detailed analysis of transient electromagnetic processes and field tests at 330 kV, 500 kV, 750 kV and 1150 kV compensated transmission lines during a single-phase fault with various transferred loads, levels of a transmission line compensation, and fault locations. These results were obtained for a 140-mile, 750 kV, power transmission line with different levels of compensation (e.g., without shunt reactor, a 240 MVA shunt reactor at the beginning of the line, and a 240 MVA reactor at each end of the transmission line). The real power, transferred through the line, was changed by varying the angle between voltages at sending and receiving from zero (0) to thirty (30) degrees.

A single-phase-to-ground short circuit was simulated at the end and middle of the transmission line. The short circuit was applied at 0.0285 sec., the faulted transmission line was cleared/opened at both sides at 0.075 sec., and the arc self-extinguished at 0.225 sec.

FIGS. 1, 2, 3 and 4 illustrate the characteristic response of the voltage present on a faulted power transmission line on which one embodiment of the invention may be implemented.

Prior art solutions have suggested employing phase shift measurements for detecting the moment when it is safe to reclose a faulted line. However, this solution is not applicable if a recovery voltage has a complex shape. For power transmission lines with intermediate and high levels of compensation, analysis of the recovery voltage on a faulted power line shows that the voltage has a complex shape.

Figure 1:
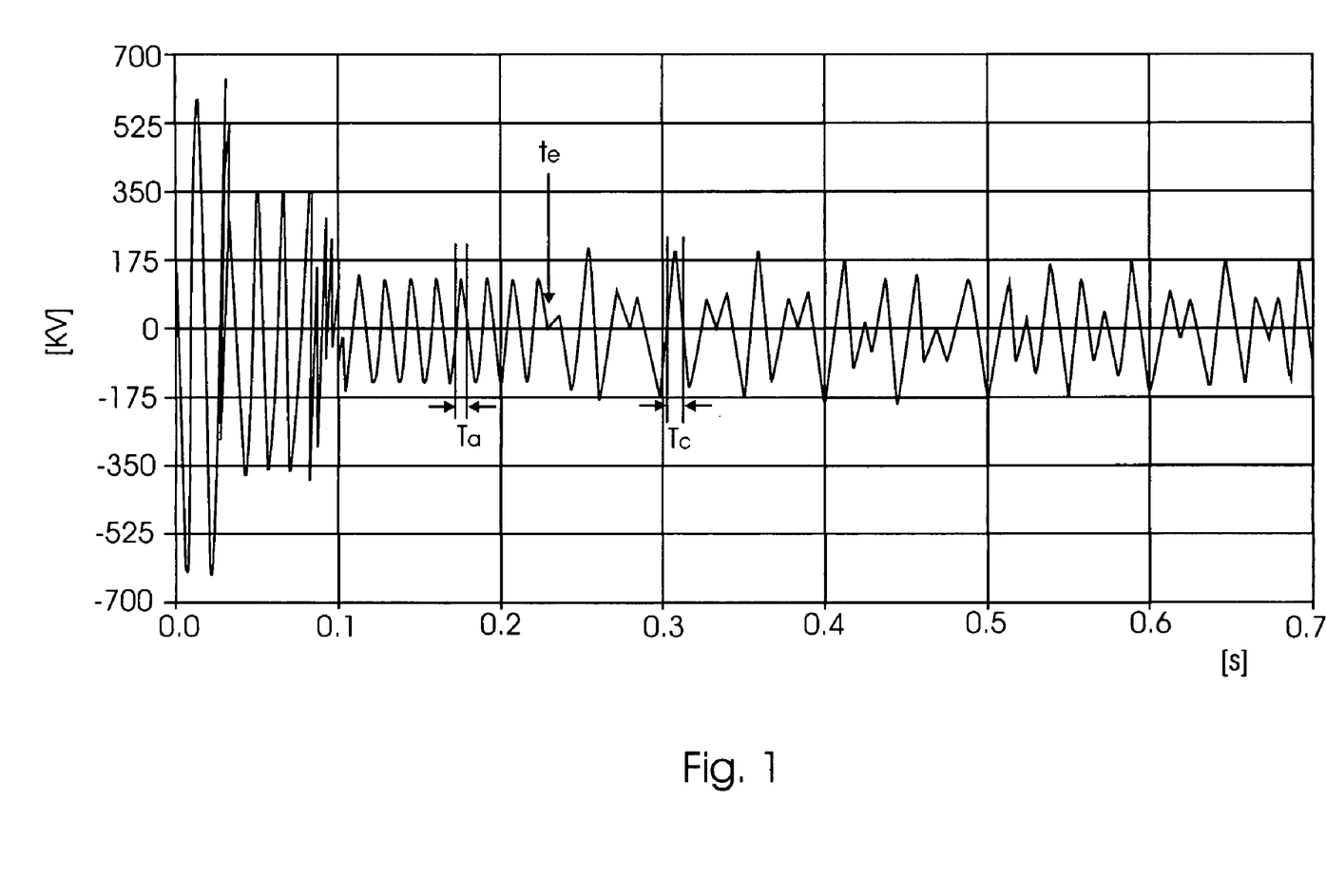
FIG. 1 illustrates the voltage response of a faulted transmission line with a reactor at the sending end (i.e., intermediate compensation level) and the fault point at the receiving end.

FIG. 1 illustrates the voltage response of a faulted transmission line with a reactor at the sending end (i.e., intermediate compensation level) and the fault point at the receiving end. Prior to the secondary arc, the frequency of any recovery voltage on the transmission line is equal to the working frequency of the line with a half period of $T_e$. A secondary arc occurs around 0.1 sec. and is extinguished around 0.22 sec. (at the point marked $t_e$). For an intermediate level of compensation, reliable detection of the secondary arc may be achieved by measuring the time of the half period or frequency $T_a$ of the recovery voltage. After self-extinguishing of the secondary arc a free component of the recovery voltage, with a frequency $T_e$ below the system frequency, will appear. This results in an increased time ($T_e > T_a$) for the half period of the recovery voltage. The increase in half period (or decrease in frequency) of the recovery voltage indicates that the arc has been extinguished. According to an embodiment of the invention, the decrease in frequency is verified by two or more confirming measurements. In one implementation, the arc is deemed extinguished if the change in frequency or half period is greater than a particular threshold amount or percent of change.

Figure 2:
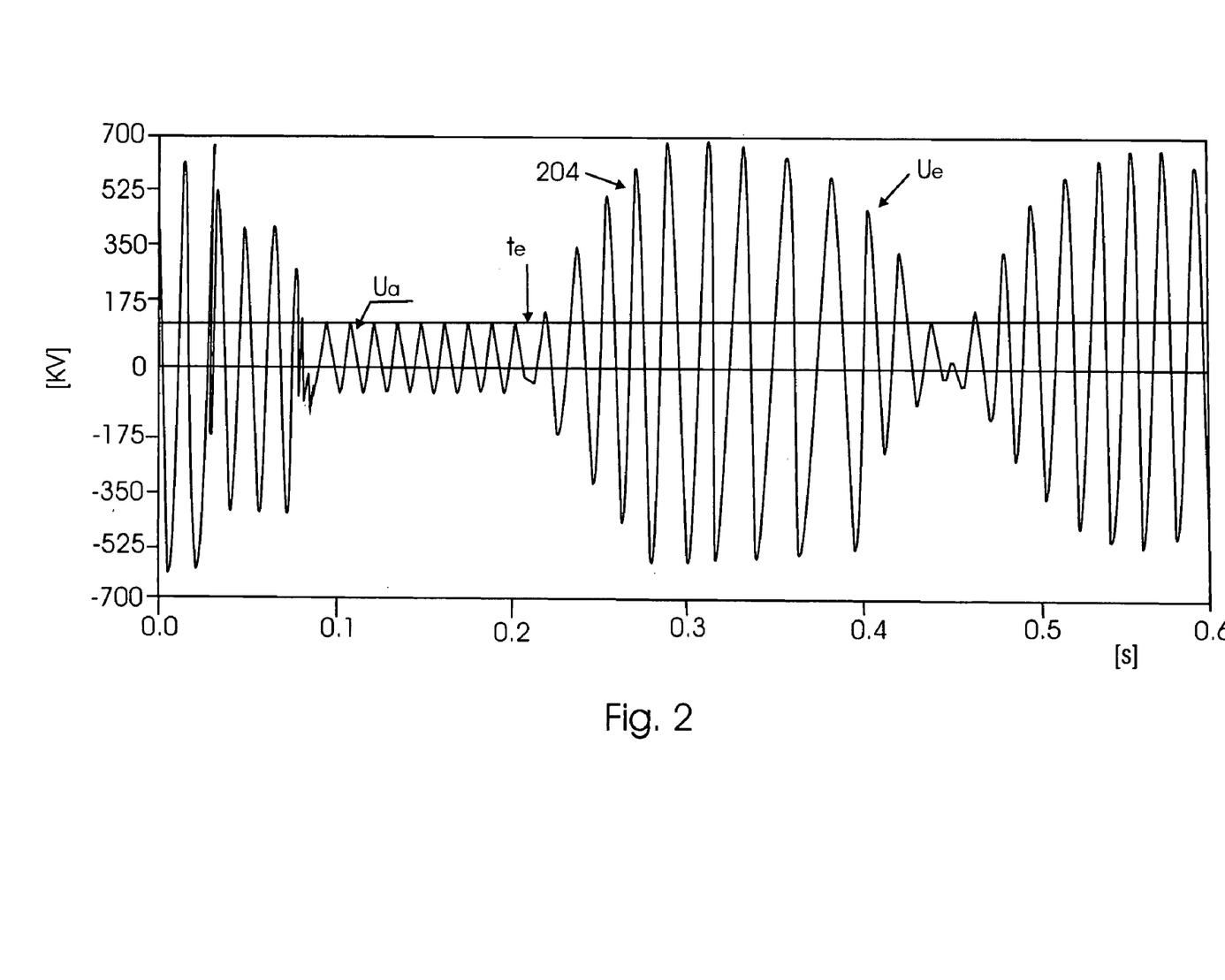
FIG. 2 illustrates the voltage response of a faulted transmission line with reactors at the sending end receiving ends (i.e., high compensation level) and the fault point at the receiving end.

FIG. 2 illustrates the voltage response of a faulted transmission line with reactors at the sending and receiving ends (i.e., high compensation level) and the fault point at the receiving end. For a high level of compensation, the free component of the recovery voltage has a frequency that is close to the power system frequency. Thus, monitoring or tracing the half period of the recovery voltage does not permit accurately detecting whether the secondary arc has been extinguished. After the secondary arc is self-extinguished at $t_e$, the amplitude $U_e$ of the recovery voltage 204 may temporarily reach close to a nominal voltage value (i.e. the normal voltage on the line) or more. For power transmission lines having such high level of compensation, monitoring or tracing the amplitude $U_e$ of the recovery voltage, in comparison to the voltage amplitude $U_a$ prior to $t_e$, permits identifying when the secondary arc is extinguished. That is, the increase in amplitude from a low amplitude $U_a$ to an increased amplitude $U_e$ indicates that the arc has been extinguished.

Figure 3:
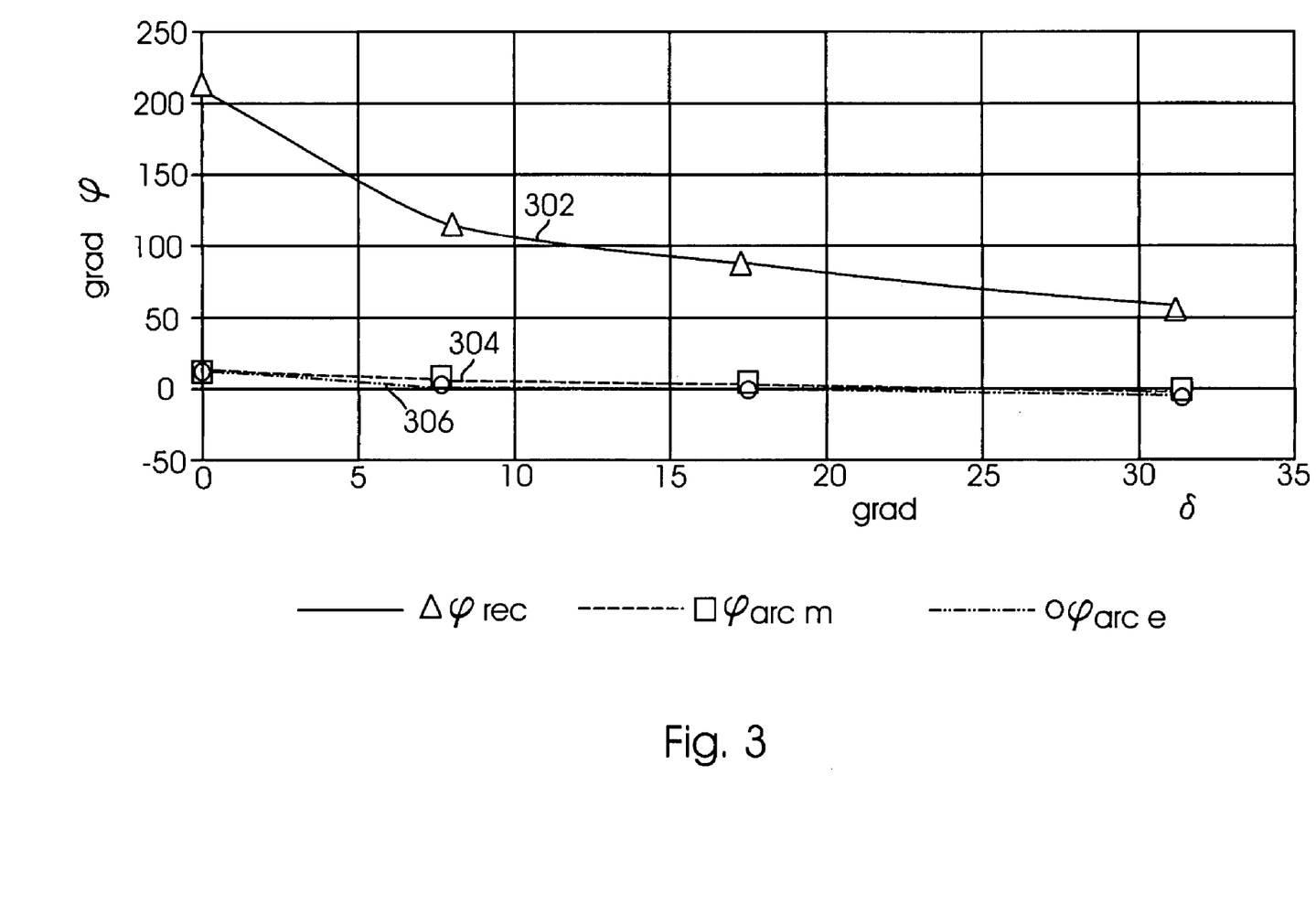
FIG. 3 illustrates the relative phase angles of a voltage during various conditions on an uncompensated transmission line.

FIG. 3 illustrates the relative phase angles of voltage during various conditions on an uncompensated transmission line. The recovery voltage phase angle (after self-extinguishing) of the arc is ($\phi_{rec}$ 302, the angle of an arc in the middle of the transmission line is ($\phi_{arc,m}$, and the angle of the arc at the receiving end of the transmission line is ($\phi_{arc,e}$. The recovery voltage phase angle is a reference vector defined as the difference between the voltages at the sending and receiving ends of a faulted transmission line. Note the difference in phase angles between the recovery voltage 302 and arching stages 304 and 306 is significant. This relationship is used to identify when arching is extinguished in an uncompensated transmission line.

Figure 4:
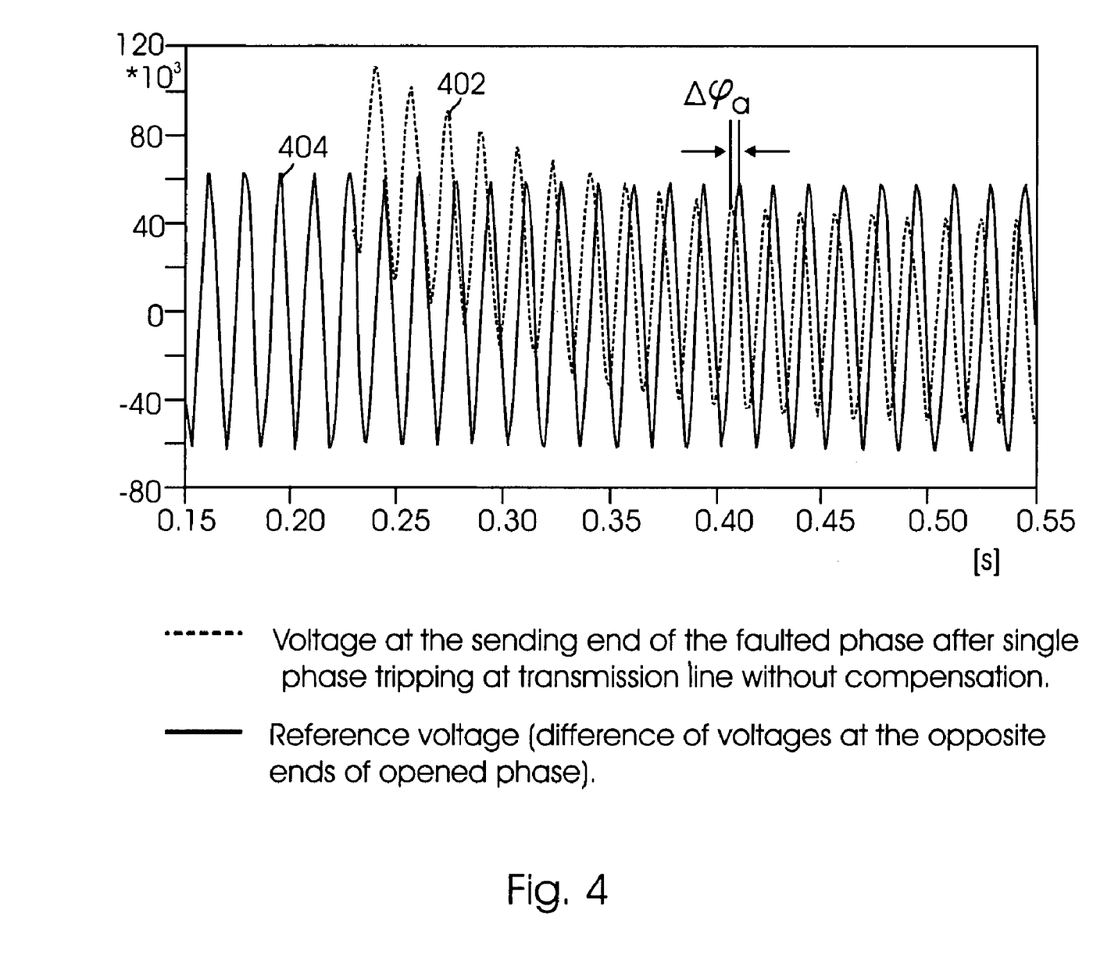
FIG. 4 illustrates the relative phase angles between a recovery voltage at the sending end of an uncompensated faulted line and a reference voltage.

FIG. 4 illustrates the relative angles between a recovery voltage 402 at the sending end of an uncompensated faulted line and a reference voltage 404. The reference voltage angle is the difference between the voltages at opposite ends of the faulted transmission line. As arching is extinguished, the phase difference $\Delta\phi_a$ can be measured. When such phase difference $\Delta\phi_a$ is ascertained, a secondary arc is deemed extinguished in an uncompensated transmission line (phase).

According to one embodiment of the invention, it may be helpful to know the level of compensation of a transmission line. By using this information, the invention can employ various algorithms for detecting the status of a secondary arc. According to one embodiment, if there are no reactors on a transmission line, the phase shift of the voltage at the faulted phase can be used to determine when an arc is extinguished. For an intermediate level of compensation, such as from 0 to 0.6-0.7 (60% to 70% compensation), the length of half period of the recovery voltage indicates when an arc has self-extinguished. For a high level of compensation, more than 0.6-0.7 (60% to 70% compensation), tracing the amplitude of the recovery voltage indicates when an arc is self-extinguished. Note that between 0.6-0.70 (60% to 70% compensation), either amplitude tracing or the half period of the recovery voltage can be used to determine when an arc has self-extinguished.

Figure 5:
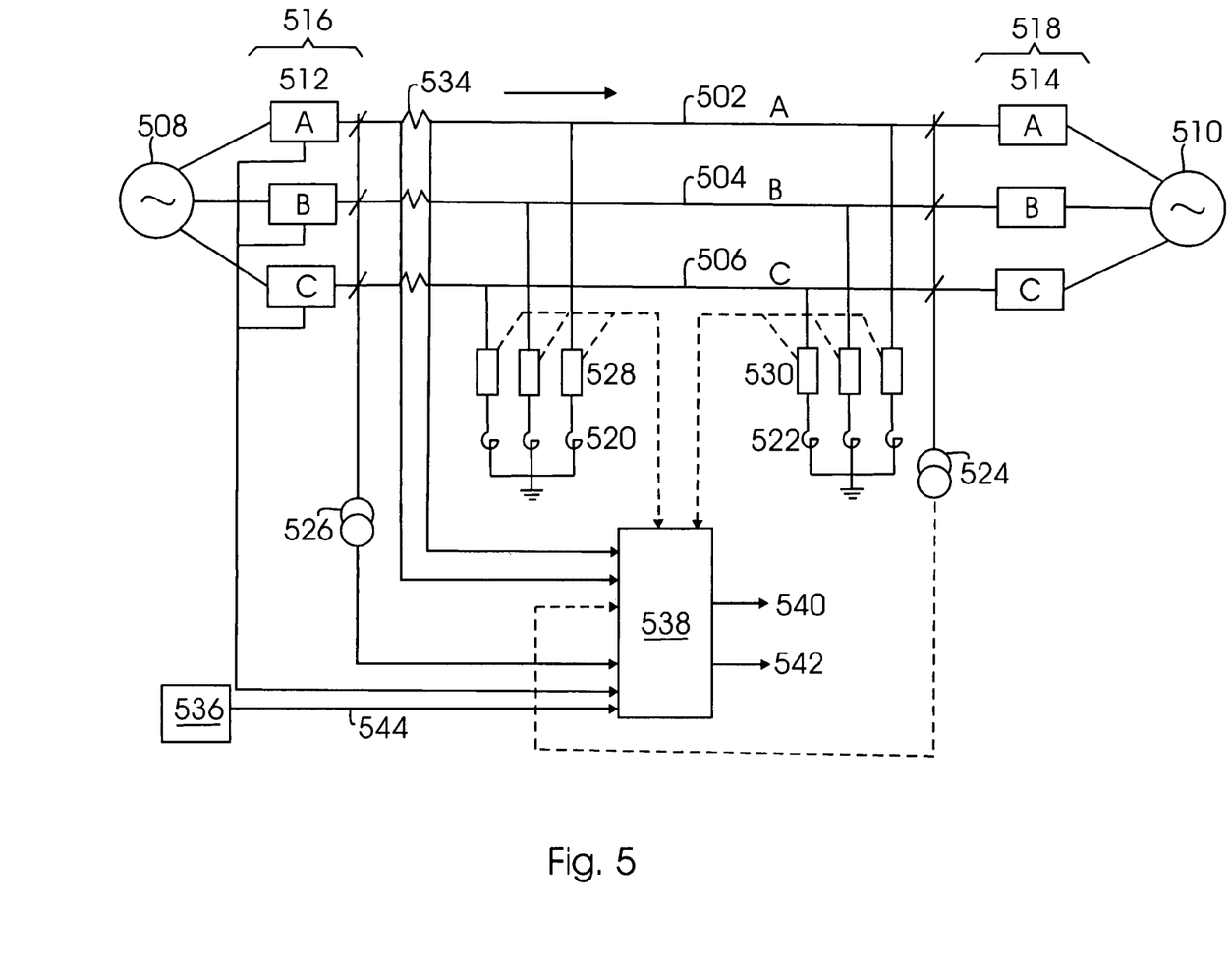
FIG. 5 is a block diagram illustrating a power distribution system with an auto-reclosing device for faulted power lines according to one embodiment of the invention.

FIG. 5 is a block diagram illustrating a power distribution system with an auto-reclosing device for faulted power lines according to one embodiment of the invention. The system includes a plurality of power transmission lines 502, 504, and 506 between two power distribution points (e.g., transformers 508 and 510). The power transmission lines 502, 504, and 506 may carry current at different phases A, B, and C. The power transmission lines 502, 504, and 506 also have circuit breakers 512 and 514 coupled at the power sending side 516 and the receiving side 518. The power transmission lines 502, 504, and 506 are compensated with shunt reactors 520 and 522 at the power sending side 516 and the receiving side 518. Additionally, potential transformers 524 and 526 are coupled at both ends of the power transmission lines 502, 504, and 506. Shunt reactor circuit breakers 528 and 530 may be coupled between the shunt reactors 520 and 522 and the power transmission lines to isolate a line if necessary. Current transformers 534 are also coupled, in-line, at the sending side 516 of the power transmission lines 502, 504, and 506.

According to one embodiment of the invention, an auto-reclosing device 536 is coupled to a secondary arc monitoring device 538. The auto-reclosing device 536 sends a signal 544 to the monitoring device 538 when a single-phase (single transmission line) fault is detected. The secondary arc monitoring device 538 is configured to determine when a secondary arc is extinguished and generate a signal 540 and/or 542 to close the circuit breaker 512/514 to a faulted power transmission line and re-establish power transmissions over said line. The secondary arc monitoring device 538 is coupled to a zero-sequence current input 534 (current transformers) from the transmission lines. It also receives inputs from the shunt reactor circuit breakers 528 and 530, voltage transformers 524 and 526, and line breakers 512 and 514.

The secondary arc monitoring device 538 also includes outputs 540 and 542 that turn circuit breakers 512 and 514 On/Off depending on whether a secondary arc is sensed.

Figure 6:
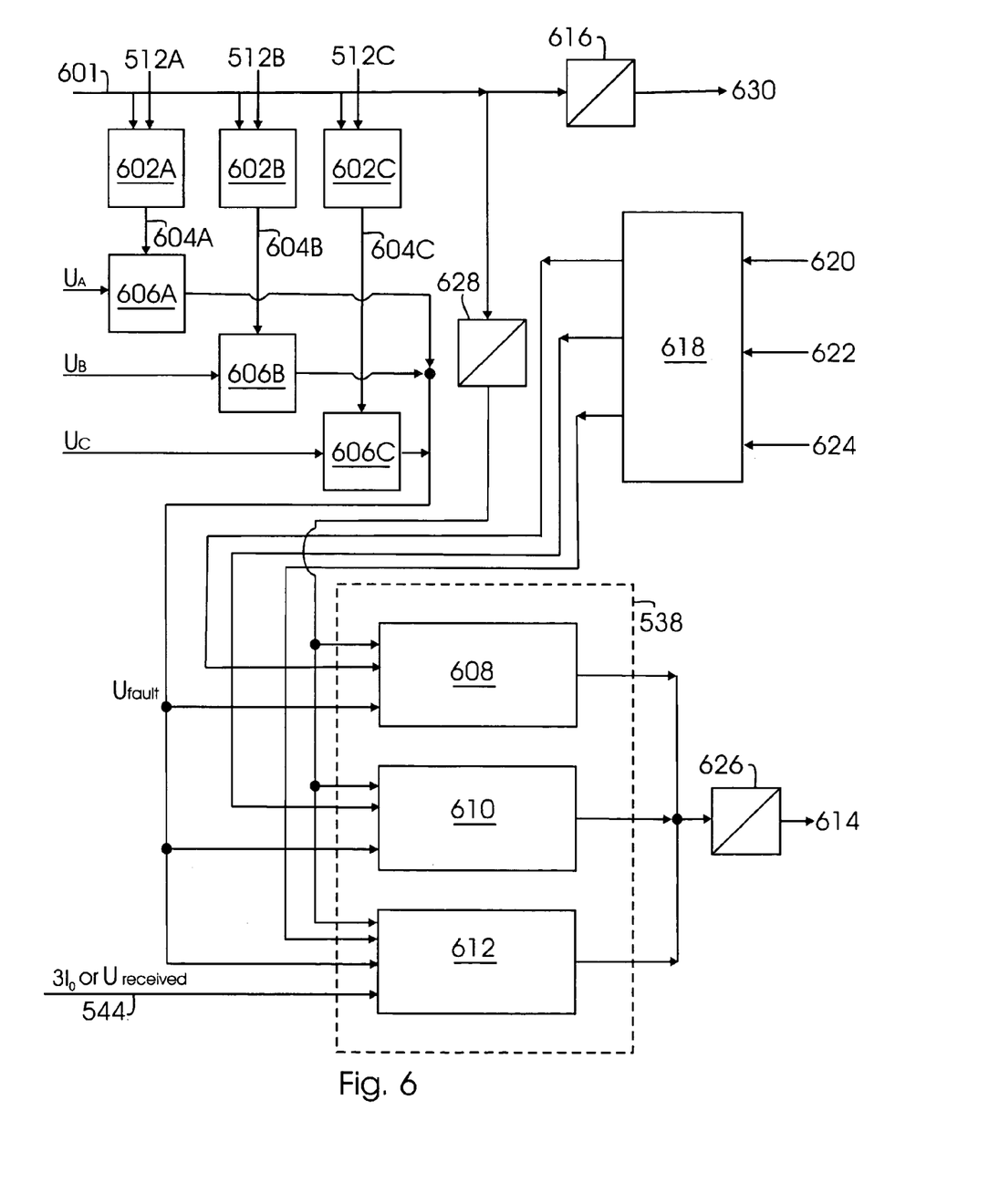
FIG. 6 illustrates a block diagram of a secondary arc monitoring device according to one embodiment of the invention.

FIG. 6 illustrates a block diagram of a secondary arc monitoring device 538 according to one embodiment of the invention. A plurality of logical AND units 602 combine the trigger signal 601 (generated when any of the circuit breakers 512 are open) and the signals from circuit breakers 512A, 512B, and 512C. These AND operations generate outputs 604A, 604B, 604C that carry information about opening of the faulted phase (604A for phase A, 604B for phase B, and 604C for phase C).

The outputs 604A, 604B, 604C of the AND logical units 602A, 602B, 602C control the switches 606A, 606B, and 606C, that connect the voltage $U_{fault}$ of the faulted phase to an input of the secondary arc monitoring device 538. Selection of the faulted phase transmission line is performed by switches 606A, 606B, and 606C. For example, if logical AND unit 602A receives input 601 (from relay protection) and input signal 512A from the circuit breaker for phase A (transmission line), then the recovery voltage at faulted phase A is coupled to the input of monitoring unit 538. Then the monitoring unit 538 begins tracing the characteristics of the secondary arc at the faulted phase A. This input $U_{fault}$ determines the status of the secondary arc at the faulted transmission line or phase.

The monitoring device 538 includes three parallel, independent, channels 608, 610, and 612 for discovering or determining the status of the secondary arc. An appropriated channel is activated depending on the level of transmission line compensation present.

If all reactors coupled to the transmission line are in service (level of compensation is more than 0.6-0.7) the unit 608, which identifies the status of the secondary arc by tracing the module of the recovery voltage at the disconnected phase, will be activated. Channel 608 determines the status of the secondary arc at the faulted line by using the amplitude of the voltage at faulted phase. As previously described, an increase in the amplitude from low amplitude to increased amplitude indicates that the arc has been extinguished. Unit 608 generates a signal for closing the opened phase (transmission line), if the module of the recovery voltage at particular end of transmission line would be more than the selected setting during the predetermined time interval.

If at least one shunt reactor at the transmission line is in service (level of compensation between 0 and 0.6-0.7), unit 610, which identifies the status of the secondary arc by verifying a frequency of free component for the recovery voltage, will be called to service. Channel 610 traces the frequency of the voltage, induced at the faulted phase. The signal to close the faulted phase is generated if the duration of half period of voltage frequency at the opened phase is more than the selected setting during the predetermined time interval.

For non-compensated lines (i.e., all reactors are switched Off, zero compensation), channel 612 measures the phase relationship between the recovery voltage and the chosen reference vector (the zero sequence current or the vector difference between recovery voltages at sending and receiving ends of the transmission line). Channel 612 compares the angle between the faulted phase voltage and the zero sequence current of the transmission line. Channel 612 may also be implemented by using measurements of angle between the voltage of the faulted phase at the sending end of the transmission line and the alternative reference vector. This alternative vector is formed by the difference between voltage vectors at the sending and receiving ends of faulted phase. Such solution, while permitting to improve selectivity of an operation, obviously requires additional high-speed communication channel.

If the closing signal 614 is not generated during time delay 616, the power transmission line is switched Off by time delay unit 616. The closing signal 614 is generated if the phase angle between the recovery voltage and the reference vector is more than a selected setting during predetermined time interval.

According to one embodiment of the invention a compensation monitor 618 receives input signals 620, 622, 624 indicating the status of shunt reactors 520 and 522 on the transmission line. The compensation monitor 618 then calculates the level of transmission line compensation and, depending on the type of compensation indicated, activates one of the plurality of channels 608, 610, and 612.

Additionally, in some embodiments of the invention, time delay units 616, 626, and 628 may be included in the auto-reclosing system for various purposes. For example, time delay unit 616 provides a "switch off" signal 630 to circuit breakers 512 at the sending side of the transmission lines if reclosing is not performed after a predetermined time interval. Time delay unit 628 activates the operation of the secondary arc monitoring unit 538 after a predetermined time delay following the triggering of the relay protection (circuit breaker). Time delay unit 626 provides a "switch On" signal 614 to the faulted transmission line/phase after the secondary arc has self-extinguished.

According to the operation of one embodiment of the invention, after a single-phase short circuit is identified by the relay protection (circuit breakers 512 & 514), the faulted phase is switched Off from both sides of the transmission line. Then the relay protection generates the fault signal 601 to activate the time delay unit 628, which triggers the operation of unit 538 for identifying the real-time status of the secondary arc at the faulted phase.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method comprising the steps of:
   (a) opening a transmission line when an arc fault has occurred;
   (b) determining the level of capacitive compensation of the transmission line;
   (c) detecting when the arc fault has been extinguished based on the level of capacitive compensation of the transmission line determined in step (b); and
   (d) reclosing the transmission line when the arc fault has been extinguished.

2. The method of claim 1, wherein the step of detecting comprises measuring a phase shift between a recovery voltage on the transmission line and a symmetrical component of a current of the transmission line.

3. The method of claim 1, wherein the step of detecting comprises measuring of an angle between the vector of a recovery voltage on the transmission line and a vector of the difference between voltages on both ends of the transmission line.

4. The method of claim 1, wherein the step of detecting comprises measuring a frequency of a recovery voltage at the transmission line.

5. The method of claim 4, wherein the level of capacitive compensation of the transmission line is defined by the number of shunt reactors coupled to the transmission line.

6. The method of claim 1, wherein, when the transmission line capacitive compensation is greater than a predetermined level, the step of detecting comprises measuring the amplitude of a recovery voltage on the transmission line, a change in the measured amplitude from a first amplitude level to an increased amplitude level indicates that the arc has been extinguished.

7. A system comprising:
   (a) a compensation detector for determining the level of capacitive compensation of a transmission line;
   (b) an arc fault monitor coupled to the compensation detector, the arc fault monitor configured for detecting when an arc fault has been extinguished based on the level of capacitance compensation of the transmission line determined in step (a); and (c) a circuit breaker coupled to the transmission line that opens the transmission line when the arc fault occurs and closes the transmission line when the arc fault is extinguished.

8. The system of claim 7 further comprising:
   a fault identifying device to determine which one of a plurality of transmission lines is open.

9. The system of claim 7 wherein the arc fault monitor is further configured to generate a signal for activating the circuit breaker to reclose the transmission line when the arc fault has been extinguished.

10. The system of claim 7 wherein the arc fault monitor is configured to detect when the arc fault is extinguished by ascertaining a phase shift between a recovery voltage on the transmission line and a symmetrical component of a current on the transmission line.

11. The system of claim 7 wherein the arc fault monitor is configured to detect when the arc fault is extinguished by measuring an angle between the vector of a recovery voltage on the transmission line and a vector of the difference between voltages on both ends of the transmission line.

12. The system of claim 7 wherein, when the transmission line capacitive compensation is below a predetermined level but greater than zero, the arc fault monitor is configured to detect when the arc fault is extinguished by measuring the frequency of a recovery voltage at the transmission line and comparing it to a reference frequency, wherein a decrease in the frequency of the recovery voltage compared to the reference frequency indicates that the arc has been extinguished.

13. The system of claim 12 wherein the level of capacitive compensation of the transmission line is defined by the number of shunt reactors coupled to the transmission line.

14. The system of claim 7, wherein when the transmission line capacitive compensation is greater than a predetermined level, the arc fault monitor is configured to detect when the arc fault is extinguished by measuring the amplitude of a recovery voltage on the transmission line and comparing it to a threshold amplitude, a change in the measured amplitude of the recovery voltage from a first amplitude level to an increased amplitude level, equal to or greater than the threshold amplitude, indicates that the arc has been extinguished.

15. A power distribution system comprising:
(a) a transmission line to carry alternating current;
(b) a circuit breaker coupled to the transmission line for opening the transmission line when an arc fault occurs;
(c) a compensation detector for determining the level of capacitive compensation of the transmission line; and
(d) an arc fault monitor coupled to the compensation detector, the arc fault monitor configured for detecting when an arc fault has been extinguished based on the level of capacitive compensation of the transmission line, the arc fault monitor being configured for providing a closing signal to the circuit breaker when the arc fault is extinguished.

16. The system of claim 15 wherein the arc fault monitor is configured to detect when the arc fault is extinguished by measuring of the phase shift between a recovery voltage on the transmission line and a symmetrical component of a current of the transmission line.

17. The system of claim 15 wherein the arc fault monitor is configured to detect when the arc fault is extinguished by measuring the angle between a vector of a recovery voltage on the transmission line and a vector of the difference between voltages on both ends of the transmission line.

18. The system of claim 15 wherein when the transmission line capacitive compensation is below a predetermined level but greater than zero, the arc fault monitor is configured to detect when the arc fault is extinguished by measuring the frequency of a recovery voltage at the transmission line, a decrease in the frequency of the recovery voltage from a first frequency to a second frequency indicating that the arc has been extinguished.

19. The system of claim 15 wherein when the transmission line capacitive compensation is greater than a predetermined level, the arc fault monitor is configured to detect when the arc fault is extinguished by measuring the amplitude of a recovery voltage on the transmission line and comparing it to a threshold amplitude, a change in the measured amplitude of the recovery voltage from a first amplitude level to an increased amplitude level, equal to or greater than the threshold amplitude, indicating that the arc has been extinguished.

* * * * *